Nov. 2, 1926.
R. A. WILSON
TOOL JOINT STOP
Filed May 15, 1924
1,605,314
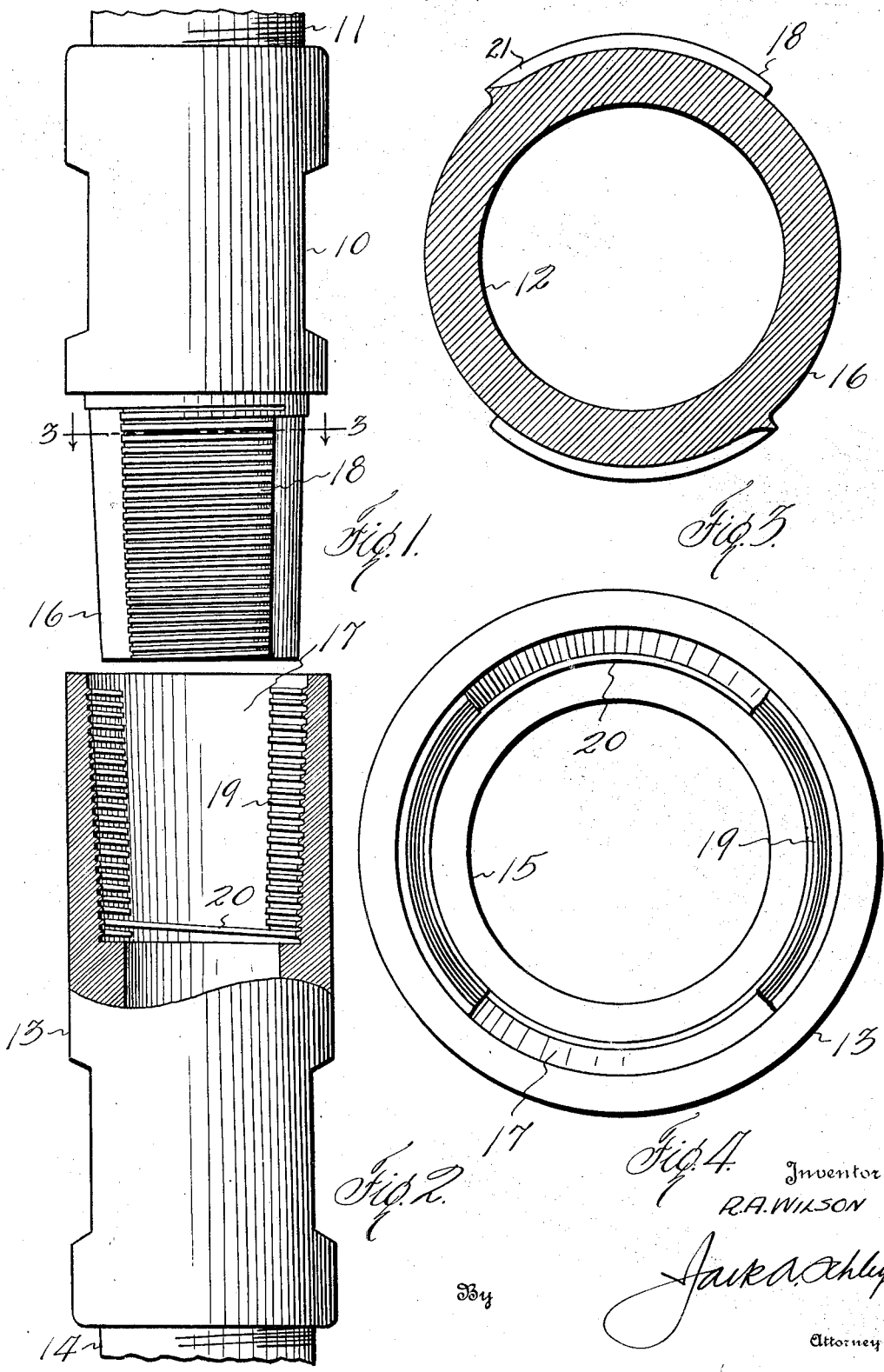

Patented Nov. 2, 1926.

1,605,314

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

TOOL-JOINT STOP.

Application filed May 15, 1924. Serial No. 713,420.

This invention relates to new and useful improvements in tool joint stops.

In tool joints and other similar couplings employing mutilated or panelled threads, as in my Patent No. 1,507,877 dated September 9, 1924, calculation must be made and frequently trial is resorted to, in disconnecting the members of the joint, it being necessary that the threads of one member be positioned in the blank or intermediate portions of the other member in order that the members may be moved longitudinally. If one member is turned too far the threads which have been carried out of one panel of threads will be entered into the threads of the other panel, thus locking the members against being disconnected. In view of this it is necessary to rotate the member which is to be disconnected, to a certain point and no further, but it is also essential to rotate the member sufficiently to disconnect the threads.

The object of the invention is to provide means for automatically stopping or arresting the rotation of one member relatively of the other so that when the threads of one member are carried out of those of the other member, further rotation will be prevented and the threads cannot be entered into the next panel.

A further object is to provide means for automatically positioning the members of coupling for disconnection, by stopping a reverse or unscrewing rotation at a predetermined point without calculation or trial.

Another object is to provide an obstruction along one vertical edge of the thread panel for preventing that edge entering the threads of a complementary panel of threads.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a view of the pin member of a joint constructed in accordance with my invention.

Fig. 2 is a view of a box constructed in accordance with my invention, a portion being shown in elevation and a portion in section.

Fig. 3 is an enlarged cross-sectional view taken on the line 3—3 of Fig. 1, and

Fig. 4 is a plan view of the box.

In the drawings the numeral 10 designates a pin member which has a screw threaded socket at its upper end to receive the usual screw threaded well tubing, stem, pipe or other tubular conductor 11, with which the joint is used. The member 10 has a longitudinal bore 12.

The pin member 10 constitutes one portion or element of the joint; while a box member 13 constitutes the other element or portion. The lower end of the box is screw threaded to receive the complementary portion 14 of the tubing or other conductor 11. The box has an axial bore 15. The member 10 and box 13 are screwed onto the tubular elements 11 and 14 in the usual manner; it being a common practice to make the threads comparatively fine and to taper the parts. This structure may vary according to the use and the particular conductors which are to be coupled. It is the intention to screw the member 10 and box 13 onto the parts 11 and 14 in such a manner that they will remain so connected when the joint is unscrewed or broken.

The member 10 is provided with a depending tapered pin 16. This pin is not tapered to the degree which has been the practice in this art, its angle of inclination to the perpendicular being much less acute than that of the pins made under Whittier Patent No. 964,353. The box 13 is formed with a countersunk tapering well 17 for receiving said pin.

The pin is provided with mutilated threads 18 arranged in two panels each occupying substantially one quarter of the circumference of the pin and disposed diametrically opposite each other. This provides gaps between the panels. The panels are formed of coarse threads, the convolutions of which are preferably, spaced sufficiently to admit the forming of a second thread of the same pitch, intermediate said convolutions. The second thread is started diametrically opposite from the first thread. From the foregoing it will be seen that one of the threads begins at the lower end of one panel; while the other thread begins at the lower end of the diametrically opposite panel. By this arrangement ample thread bearing is had and a coarse thread is available. It is within the scope of the invention to utilize a single thread.

The well 17 is provided with threads 19 which are mutilated and formed into diametrically opposed panels having substantially the same width as the gaps between the panels of the pin, so that the pin may be inserted in the well 17 and the threads 18 thereof, received in the gaps between the threads 19 of the box 13. It is merely necessary to insert the pin 16 in the well 17 and give the member 10, a quarter turn or rotation, whereby the threads 18 ride into the threads 19 and couple the parts of the joint together.

It will be apparent that some means for guiding the blunt ends of the threads 18 between the threads 19 should be provided, otherwise the ends of the threads would abut and prevent threading. To care for this I provide at the bottom of the well, continuations 20 of the threads 19, for each of the double threads 18. These continuations 20 connect the panels and when the pin 16 is inserted in the well 17 the threads 18 of the panels are received upon said continuations, which guide said threads 18 into the threads 19 of the panels of the box, when the member 10 is rotated. It will be seen that the threads 18 of the pin will freely enter the threads 19 of the box.

The main feature of the invention has to do with means for limiting the counter or reverse rotation of the pin when it is desired to disconnect or uncouple the joint. It will be apparent that when the member is rotated to unscrew it, the threads 18 will ride out of one panel and into the threads of the other panel unless the rotation is stopped with such nicety as to bring the threads 18 wholly within the gaps between the threads 19. To do this requires that either the correct position be calculated or marks made upon the pin and box for registration at this position. Such marks would be obscured or obliterated in many cases and are not practical.

It will be seen that when the panels are intermeshed the shoulder of the member 10 will rest upon the upper edge of the box 13 and thus further rotation will be impossible. By providing an obstruction on the trailing or following ends of the threads 18 and proportioning the parts so that this obstruction is not carried into the threads 19, but merely up to the same, it will be seen that upon a reverse or counter turn this obstruction would not enter the threads of the other panel in the box, consequently the pin would be arrested with the threads 18 within the gaps between the threads 19 of the well 17.

In carrying out this feature many instrumentalities could be employed and I have obtained satisfactory results by portions of the metal between the ends of the threads 18 to form bosses 21. This may be easily accomplished in cutting the threads. It is obvious that these bosses upon a reverse rotation of the pin, would not enter between the threads 19. It is also apparent to those skilled in the art that other means might be worked out for the purpose. The invention contemplates any means whereby the pin is brought to a positive stop when its threads are clear of the threads 19.

What I claim, is:

1. A coupling comprising in combination, a pin having threads arranged in spaced panels on diametrically opposite sides thereof, a box having a well shaped to receive said pin and provided with threads arranged in spaced panels to mesh with the threads of the pin, and means within one set of threads for preventing the threads of the panels of the pin from entering the threads of the panels of the box upon a releasing rotation of the pin.

2. A coupling comprising a pin having threads arranged in spaced panels on diametrically opposite sides thereof with an unobstructed intermediate gap, a well shaped box to receive said pin and provided with threads extending for the width of said gap and arranged in spaced panels to mesh with the threads of the pin, and an abutment within the thread panels of the pin to limit its travel when the pin is rotated in a releasing direction.

3. A coupling comprising in combination, a pin having threads arranged in spaced panels on diametrically opposite sides thereof with an unobstructed intermediate gap, a box having a well shaped to receive said pin and provided with threads arranged in spaced panels to mesh with the threads of the pin when rotated in one direction, and bosses between the trailing ends of the thread panels of the pin for preventing the entrance of said threads between the threads of the panels of the box upon a reverse rotation of the pin.

In testimony whereof I affix my signature.

ROBERT A. WILSON.